UNITED STATES PATENT OFFICE.

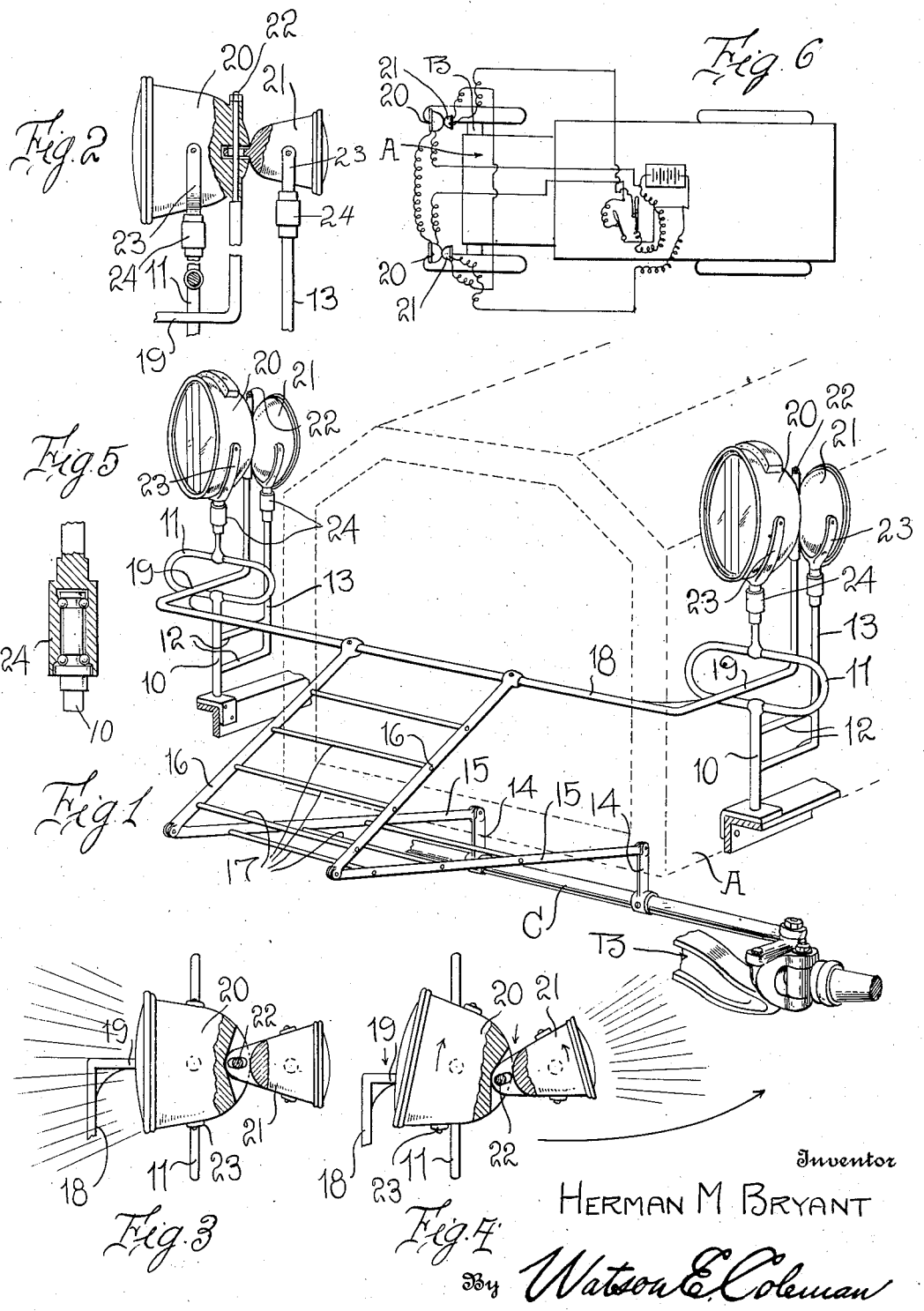

HERMAN M. BRYANT, OF MILAN, TENNESSEE.

DIRIGIBLE HEADLIGHT.

1,250,277.  Specification of Letters Patent.  Patented Dec. 18, 1917.

Application filed August 19, 1916. Serial No. 115,855.

*To all whom it may concern:*

Be it known that I, HERMAN M. BRYANT, a citizen of the United States, residing at Milan, in the county of Gibson and State of Tennessee, have invented certain new and useful Improvements in Dirigible Headlights, of which the following is a specification, reference being had to the accompanying drawings.

This invention relates to dirigible head lights for automobiles and generally speaking its object is to provide forward lamps and rearwardly directed lamps so supported on an automobile that they will be rotated in a horizontal plane and so connected with the steering rod that the forward lamps will be turned in the same direction that the machine is turning so as to thereby illuminate the road during the turning operation.

A further object is to provide in connection with the forward lamps, rearwardly directed lamps to be used when the machine is backing, these rearwardly directed lamps being also so connected to the steering mechanism that they will turn so as to illuminate the road as the car turns in backing.

A further object of the invention is to provide upon the forward end of an automobile two pairs of lamps, there being on each side of the machine a forwardly directed lamp and a rearwardly directed lamp operatively connected to the forwardly directed lamp, each lamp of each pair being pivotally supported, the pair of lamps being hingedly connected to each other and there being a connection between the steering rod of the automobile and the hinged joint of these two lamps so that as the steering rod is shifted in one direction, the conjoined lamps will be turned out of alinement and into angular relation with each other so that the forwardly directed lamps will be disposed in the same angle or approximately the same angle to which the wheels are turned while the rearwardly directed lamps will be disposed reversely to the angle of the forwardly directed lamps.

Other objects will appear in the course of the following description.

My invention is illustrated in the accompanying drawings, wherein:

Figure 1 is a perspective view of the forward end of an automobile with my invention applied thereto, the axle C being shown as advanced beyond its proper point, and the rod 16 shown as inclined in consequence;

Fig. 2 is a side elevation of a pair of lamps 20 and 21, the lamp housings being partly broken away;

Fig. 3 is a top plan view of the lamps shown in Fig. 2, the lamps being partly broken away to show the connection between the lamps;

Fig. 4 is a like view to Fig. 3 but showing the lamps turned;

Fig. 5 is a fragmentary sectional view of the sleeve 24 on the post 10; and

Fig. 6 is a diagrammatic view of the manner in which the lamps are wired.

Referring to the drawings A designates the body of an automobile and B designates the front axle, the wheels being mounted upon the usual knuckles connected to the steering rod C. All of these parts are of the usual or ordinary construction. Extending upwardly from the body of the automobile and mounted thereon in any suitable manner are the laterally disposed standards 10 which are formed intermediate their ends with vertically disposed loops 11. The standards 10 extend above the loops 11 to support the forward lamps, as will be more fully described. Extending rearwardly from these standards are the brackets 12 which support the upwardly extending posts 13. Mounted on the steering rod C are the upwardly extending relatively short arms 14 and to these arms 14 are pivotally connected the forwardly extending rods 15. The rods 15 move laterally with the steering rod C but have free vertical movement. To the forward ends of these rods 15 are connected the upwardly extending rods 16, these rods 16 being pivoted to the forward ends of the rods 15. The rods 15 and 16 are braced by transversely extending braces 17. Attached to the upper ends of the rods 16 and laterally movable with these rods 16 is a transverse rod 18. The rods 16 are hingedly connected to the rod 18 but it will be seen that the rod 18 will move with the connecting members 16, 15 and the steering rod C. The rod 18 at its ends is angularly bent so as to form rearwardly extending rigid arms 19 which pass through the loops 11.

On each side of the body of the automobile at the front thereof are mounted a pair of lamps, one of these lamps being designated 20 and the other 21. The lamp 20 is normally directed forward, while the lamp 21 is normally directed rearward. The lamp 21, or to be more exact, the lamp housing is smaller than the lamp housing 20 and at its rear end projects into the lamp housing 20. A bolt 22 extends up through the upper and lower walls of the lamp housing 20 and through the lamp housing 21 so as to form a pivotal connection between these housings, the lamp housing 21 and the upper and lower walls of the lamp housing 20 being formed with slots wherein the bolt 22 plays. The bolt 22 extends vertically downward and is connected to the extremity of the angular arm 19. Upon the forward end of the lamp housing 20 there is provided a transversely extending supporting member 23, and depending from this member is a sleeve 24 fitting over the upper end of the vertical post 10, and having bearing thereon. Ball bearings are disposed between this sleeve and the post so as to provide for a free rotation of the lamp housing upon the post 10. The rearwardly facing lamp 21 is also formed with a supporting member 23 carrying a sleeve 24, this sleeve having bearing upon the upwardly extending post 13 on the bracket 12. It will thus be seen that each of the lamps 20 and 21 is rotatably mounted upon a corresponding supporting post and that these lamps are hingedly connected to each other at their abutting ends and that the pintle of this hinge is formed by the bolt 22 and that when the rod 18 is shifted in one direction or the other, the bolts 22 will be shifted in one direction or the other and this will cause the rotation of the lamp housings in opposite directions. In other words, as illustrated in Fig. 4, a shifting of the rod 18 to the left which will turn the wheels so that the machine will turn to the right, will shift the forward lamp housings 20 in the same direction as the wheels, while the rear lamp housings will be shifted reversely. Thus when the machine is going forward the light from the forward lamps will be directed approximately parallel to the wheels and thus illuminate the turn of the road while on the other hand if the machine is backing on a curve, the rearwardly directed lamps will also illuminate the ground upon which the car is going to back and turn. It is of course obvious that when the car is backing without turning as it backs, the lamps will be held in line with the vehicle and the straight road will be illuminated.

Preferably the lamps for the forward lamp housings are disposed in one circuit with a source of energy, while the lamps for the rear lamp housings are each disposed in separate circuit, and each controlled by a separate switch or so controlled that each rearwardly directed lamp may be energized only when it is desired to use it. It is obvious that under ordinary circumstances there would be no necessity of using the rearwardly directed lamps. They would be only used when backing and then only the lamp on one side or the other used.

It will be seen that my invention provides not only for dirigible head lights, but also provides for dirigible rearwardly directed headlights. It will also be obvious that the particular construction of the lamps is not important and that various modifications might be made in the details of construction without departing from the spirit of my invention.

Having described my invention, what I claim is:

1. The combination with an automobile, of a forwardly directed road illuminating lamp and a rearwardly directed road illuminating lamp, both of said lamps being rotatably mounted for movement in a horizontal plane, and means connected to the steering rod of the automobile for shifting the said lamps in reverse directions to each other and shifting the forwardly directed lamp in correspondence with the turning of the steering wheels of the automobile.

2. The combination with an automobile, of two pairs of lamps mounted upon the forward end of the automobile, each pair of lamps comprising a forwardly directed lamp and a rearwardly directed lamp, each of the lamps being mounted for rotation in a horizontal plane, the lamps being operatively hinged to each other at their abutting ends, and means operatively connected to the steering rod of the automobile and to the hinged joint between the lamps for shifting said lamps in a horizontal plane.

3. The combination with an automobile including a steering rod operatively connected to the walls of the automobile, of a pair of lamps mounted at the forward end of the automobile and on each side thereof, each of the lamps of a pair being supported for rotation in a horizontal plane, the lamps of each pair being hingedly connected to each other at their abutting ends, a bolt forming a pintle for each hinge, a transversely shiftable rod having arms connected to each pintle, and operative connections between the steering rod of the machine and said transversely shiftable rod whereby both of said rods shall move together in the same direction.

4. The combination with an automobile including a steering rod operatively connected to the wheels of the automobile, of a pair of lamps mounted at the forward end of the automobile and on each side thereof, each of said lamps of a pair being supported for rotation in a horizontal plane, the lamps of each pair being hingedly connected to each other at their abutting ends, a bolt forming a pintle for each hinge, a transversely shiftable rod having arms connected to each pintle, operative connections between the steering rod and the last named rod whereby both of said rods shall move together in the same direction, said operative connections comprising forwardly directed arms pivotally connected at their rear ends to the steering rod and upward, extending arms pivotally connected at their lower ends to the first named arms and at their rear ends to said laterally shiftable rod.

5. The combination with an automobile including a supporting rod, of posts mounted upon the automobile extending up therefrom and having loops intermediate their ends, brackets carried one on each post and having upwardly extending portions, a forwardly directed lamp housing rotatably mounted on each of the first named posts, a rearwardly directed lamp housing rotatably supported on each of the second named posts, each pair of forwardly and rearwardly directed housings being hinged to each other and having a pintle extending downward, a transversely extending rod having angularly disposed arms extending rearward and operatively connected to said pintles, and an operative connection between the steering rod and said first named rod to cause a unitary shifting of the two rods.

In testimony whereof I hereunto affix my signature in the presence of two witnesses.

HERMAN M. BRYANT.

Witnesses:
J. E. FIELDS,
TOM ADAMS.